Patented June 21, 1949

2,473,950

UNITED STATES PATENT OFFICE 2,473,950

ANTHRIMIDE-CARBAZOLE DYESTUFFS

Hermann Hauser, Binningen, and Max Bommer, Riehen, Switzerland, assignors to the Swiss firm of Ciba Limited No Drawing. Original application April 20, 1943, Serial No. 483,804. Divided and this application September 17, 1948, Serial No. 49,847. In Switzerland April 18, 1942

Section 1, Public Law 690, August 8, 1946
Patent expires April 18, 1962

1 Claim. (Cl. 260—316)

This is a division of our co-pending application Serial No. 483,804, filed April 20, 1943 (now U. S. Patent No. 2,459,424, granted January 18, 1949).

The present invention is concerned with new anthraquinone dyestuffs and more particularly those of the anthrimide type, i. e. of that type of dyestuffs in which anthraquinone radicals are interconnected with other radicals by means of imino groups. The said other radicals may also be anthraquinone radicals, or may be of another type, preferably aromatic. The present invention is also concerned with dyestuffs of the so-called anthrimide-carbazole type. Anthrimide-carbazoles are usually obtained by treating anthrimides with condensing agents such as aluminium chloride or in some cases sulfuric acid and its functional derivatives, such as chloro-sulfonic acid.

Further objects of the present invention will become apparent as the specification proceeds.

It has been found that valuable anthraquinone vat dyestuffs can be obtained by condensing a 1:4-dihalogen-5-benzoylaminoanthraquinone for example 1:4-dibromo or 1:4-dichloro-5-benzoylaminoanthraquinone with one molecular proportion of 1-aminoanthraquinone and one molecular proportion of 1-amino-5-benzoylaminoanthraquinone and carbazolizing the trianthrimide thus obtained. The condensation may be effected by heating the components in boiling naphthalene with addition of an acid binding agent such as sodium carbonate and of a catalyst such as a copper salt. The carbazolizing reaction may be effected by means of aluminium chloride, preferably in combination with tertiary aromatic compounds such as pyridine.

The resulting compounds correspond to the formula

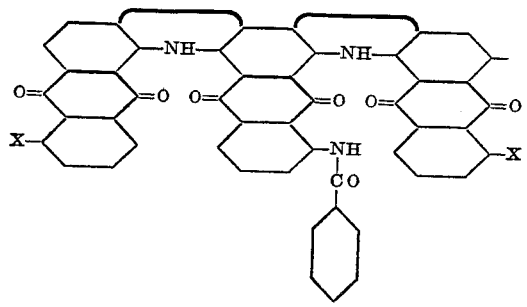

wherein one X stands for a benzoylamino group and the other X for hydrogen.

The products of the invention are valuable vat dyestuffs. They can be used for example for dyeing and printing vegetable fibers fast brown tints.

The following examples illustrate the invention, the parts being by weight unless otherwise stated:

Example 1

39.6 parts of 1:4-dichloro-5-benzoylaminoanthraquinone (1 mol), 22.3 parts of 1-aminoanthraquinone (1 mol) and 34.3 parts of 1-amino-5-benzoylamino anthraquinone (1 mol) are heated to boiling for 18 hours, together with 2 parts of cuprous chloride, 25 parts of sodium carbonate and 400 parts of naphthalene. At about 130° C. 800 parts of chlorobenzene are added and the product of the reaction filtered off at 50–55° C. through a previously warmed Büchner funnel, washed with chlorobenzene and the chlorobenzene finally driven off in steam. The new compound which probably corresponds with the formula:

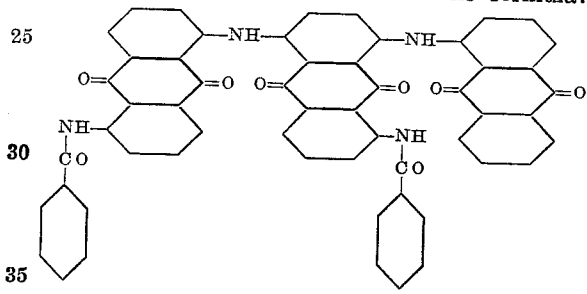

or is a mixture of both, dissolves in concentrated sulphuric acid to give an olive colour. On adding this solution to water, brown flocks are obtained.

Example 2

To a mixture of 80 parts of pyridine and 40 parts of aluminium chloride prepared at 50–100° C., 20 parts of the trianthrimide obtained as described in Example 1 are added at 100° C. in several portions, and the whole heated for 1 hour to 130–135° C. The melted mass is then added to dilute caustic soda and the pyridine distilled off in steam. The dyestuff is then isolated from the distillation residue by filtration, whereas the aluminium goes into the filtrate in the form of sodium aluminate.

The new dyestuff dissolves in concentrated sulphuric acid to a blue solution and dyes cotton from the vat a very fast and very strong brown shade.

Having thus described the invention, what is claimed is:

An anthrimide-carbazole of the formula

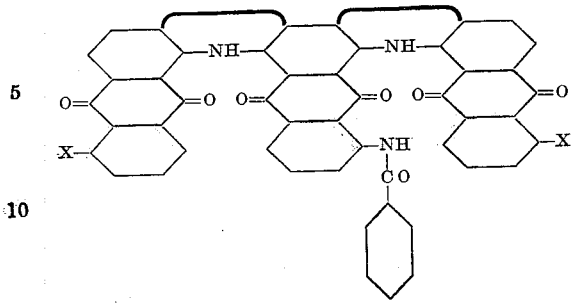

wherein one X stands for a benzoylamino group and the other X for hydrogen.

HERMANN HAUSER.
MAX BOMMER.

No references cited.